(12) United States Patent
Kuboshima

(10) Patent No.: US 10,979,261 B2
(45) Date of Patent: Apr. 13, 2021

(54) RECEIVE DEVICE, RECORDING MEDIUM FOR RECEIVING SIGNAL

(71) Applicant: JVCKENWOOD Corporation, Yokohama (JP)

(72) Inventor: Ryo Kuboshima, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 16/802,618

(22) Filed: Feb. 27, 2020

(65) Prior Publication Data

US 2020/0274744 A1 Aug. 27, 2020

(30) Foreign Application Priority Data

Feb. 27, 2019 (JP) .............................. JP2019-034513

(51) Int. Cl.
*H04L 27/00* (2006.01)
*H04L 27/152* (2006.01)
*H04B 1/12* (2006.01)
*H04B 17/20* (2015.01)

(52) U.S. Cl.
CPC .......... *H04L 27/1525* (2013.01); *H04B 1/12* (2013.01); *H04B 17/20* (2015.01)

(58) Field of Classification Search
CPC ........ H04L 27/1525; H04B 1/12; H04B 17/20
USPC ........................................ 375/224, 316, 317
See application file for complete search history.

(56) References Cited

U.S. PATENT DOCUMENTS

| 6,748,200 | B1 * | 6/2004 | Webster | ................ | H03D 3/008 375/345 |
| 2005/0153676 | A1 * | 7/2005 | Ruelke | .................... | H04B 1/30 455/324 |
| 2016/0013816 | A1 * | 1/2016 | Xia | ......................... | H04B 1/18 375/350 |
| 2016/0218893 | A1 * | 7/2016 | Waheed | ............... | H04L 25/067 |
| 2019/0190554 | A1 * | 6/2019 | Srinivasan | .......... | H04B 17/318 |

FOREIGN PATENT DOCUMENTS

JP H03-016349 A 1/1991

* cited by examiner

*Primary Examiner* — Don N Vo
(74) *Attorney, Agent, or Firm* — Brundidge & Stanger, P.C.

(57) ABSTRACT

A quadrature detector subjects a received signal to quadrature detection and outputs a base band signal. A direct current component measurement circuit measures a magnitude of a direct current component included in the base band signal from the quadrature detector. A first HPF and a second HPF reduce the direct current component included in the base band signal from the quadrature detector. A demodulator demodulates the base band signal output from the first HPF and the second HPF. A controller exercises control to attenuate a level of the received signal input to the quadrature detector when the magnitude of the direct current component measured by the direct current component measurement circuit is equal to or larger than a threshold value.

3 Claims, 4 Drawing Sheets

FIG.2A

| MAGNITUDE OF DC COMPONENT | SIGNAL INTENSITY | ATTENUATION CONTROL |
|---|---|---|
| EQUAL TO LARGER THAN FIRST THRESHOLD VALUE | EQUAL TO LARGER THAN SECOND THRESHOLD VALUE | YES |
| EQUAL TO LARGER THAN FIRST THRESHOLD VALUE | SMALLER THAN SECOND THRESHOLD VALUE | NO |
| SMALLER THAN FIRST THRESHOLD VALUE | EQUAL TO LARGER THAN SECOND THRESHOLD VALUE | NO |
| SMALLER THAN FIRST THRESHOLD VALUE | SMALLER THAN SECOND THRESHOLD VALUE | NO |

FIG.2B

| MAGNITUDE OF DC COMPONENT | SIGNAL INTENSITY | ATTENUATION CONTROL |
|---|---|---|
| EQUAL TO LARGER THAN THIRD THRESHOLD VALUE | EQUAL TO LARGER THAN FOURTH THRESHOLD VALUE | YES |
| EQUAL TO LARGER THAN THIRD THRESHOLD VALUE | SMALLER THAN FOURTH THRESHOLD VALUE | YES |
| SMALLER THAN THIRD THRESHOLD VALUE | EQUAL TO LARGER THAN FOURTH THRESHOLD VALUE | YES |
| SMALLER THAN THIRD THRESHOLD VALUE | SMALLER THAN FOURTH THRESHOLD VALUE | NO |

RECEIVE DEVICE, RECORDING MEDIUM FOR RECEIVING SIGNAL

CROSS-REFERENCE TO RELATED APPLICATION

This application is based upon and claims the benefit of priority from the prior Japanese Patent Application No. 2019-34513, filed on Feb. 27, 2019, the entire contents of which is incorporated herein by reference.

BACKGROUND OF THE INVENTION

1. Field of the Invention

The present invention relates to receive technologies and, in particular, a receive device and a recording medium for receiving signal.

2. Description of the Related Art

Direct conversion Frequency Modulation (FM) receivers convert an RF signal into a base band signal by quadrature detection and subsequently amplify the base band signal using an amplifier. Because an unnecessary direct current component is output by the amplifier, the FM receiver reduces the direct current component included in the base band signal using a coupling capacitor. Further, the FM receiver subjects the base band signal with the direct current component reduced to FM detection (see, for example, patent literature 1).

[patent literature 1] JP3-16349

In the direct conversion scheme, an unnecessary direct current component is produced in the base band signal as a result of, for example, distortion of a strong interference wave. The direct current component is superimposed on the base band signal of the desired wave, with the result that the demodulated signal is degraded. Further, even if the unnecessary direct current component is removed, degradation in the demodulated signal is unavoidable unless the impact of interference wave is inhibited.

SUMMARY OF THE INVENTION

A receive device according to an embodiment includes: a quadrature detector that subjects a received signal to quadrature detection and outputs a base band signal; a direct current component measurement circuit that measures a magnitude of a direct current component included in the base band signal from the quadrature detector; a high-pass filter that reduces the direct current component included in the base band signal from the quadrature detector; a demodulator that demodulates the base band signal output from the high-pass filter; and a controller that exercises control to attenuate a level of the received signal input to the quadrature detector when the magnitude of the direct current component measured by the direct current component measurement circuit is equal to or larger than a threshold value.

Optional combinations of the aforementioned constituting elements, and implementations of the embodiment in the form of methods, apparatuses, systems, recording mediums, and computer programs may also be practiced as additional modes of the embodiments.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 2A and 2B show a data structure of the table maintained in the controller of FIG. 1;

DETAILED DESCRIPTION OF THE PREFERRED EMBODIMENT

The invention will now be described by reference to the preferred embodiments. This does not intend to limit the scope of the present invention, but to exemplify the invention.

A summary of the present invention will be given before describing the invention in specific detail. An embodiment of the present invention relates to a receive device configured to perform quadrature detection of direct conversion type. Because a direct current component included in a base band signal subjected to quadrature detection causes poor demodulation characteristics, the receive device uses a high-pass filter to reduce the direct current component included in the I-phase base band signal and the Q-phase base band signal subjected to quadrature detection. In the case an interference wave is received in the receive device like this, degradation in the demodulated signal caused by superimposition of the direct current component is reduced, but the demodulated signal may be degraded due to poor localized sensitivity, i.e., S/N ratio due to an increase in the noise floor level.

In the presence of an intense interference wave, the performance can be improved by increasing the attenuation or lowering the gain of a low noise amplifier (LNA), etc., but then this results in poor sensitivity when only the desired wave is received. For this reason, it is necessary to determine the presence or absence of an interference wave and to switch the attenuation or the gain accordingly. The electric field intensity of a signal subjected to ADC can be measured by using a publicly known technology, but addition of a circuit would be necessary to measure the level of an interference wave outside the ADC band and so cannot be realized easily.

The receive device according to the embodiment addresses this by measuring the DC level after quadrature detection, by using the fact that self-mixing occurs and the self-mixed signal is down-converted to a direct current in the case the power of the interference wave is large. To describe it in further detail, when the power of a signal including an interference wave is large, self-mixing occurs as a result of the signal entering the local oscillator. Since the self-mixed signal is down-converted to a DC, correlation occurs between the DC level and the signal level. Therefore, the DC level is measured to know the magnitude of the signal level. Further, the receive device changes the attenuation of the signal when the DC level is equal to larger than a threshold level.

Figure 1:
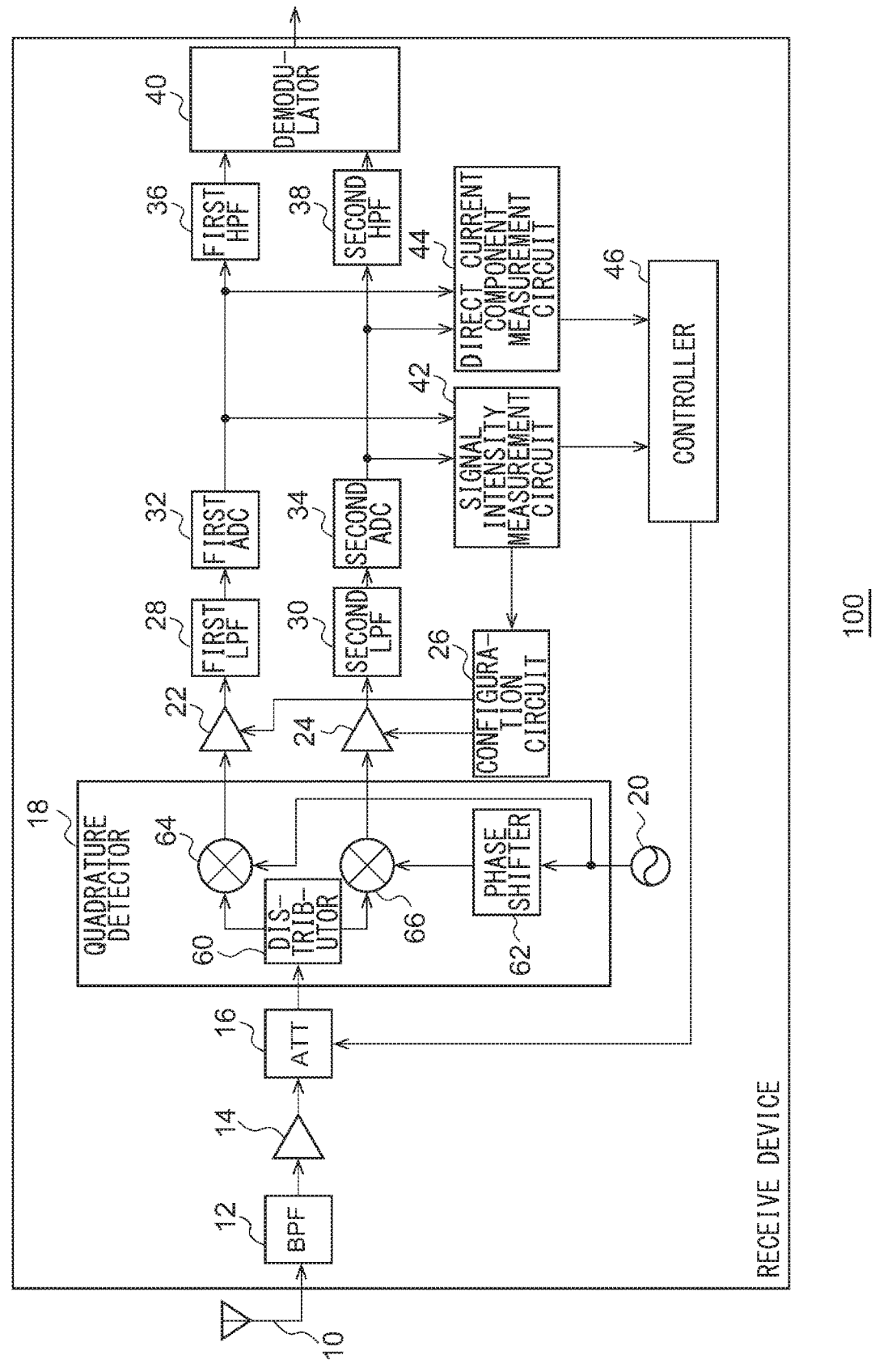
FIG. 1 shows features of a receive device according to the embodiment.

FIG. 1 shows features of a receive device 100. The receive device 100 includes an antenna 10, a Band-Pass Filter (BPF) 12, a low-noise amplifier 14, an attenuator 16, a quadrature detector 18, a local oscillator 20, a first amplifier 22, a second amplifier 24, a configuration circuit 26, a first Low-Pass Filter (LPF) 28, a second LPF 30, a first ADC 32, a second ADC 34, a first High-Pass Filter (HPF) 36, a second HPF 38, a demodulator 40, a signal intensity measurement circuit 42, a direct current component measurement circuit 44, and a controller 46. The quadrature detector 18 includes a distributor 60, a phase shifter 62, a first mixer 64, and a second mixer 66.

The antenna 10 receives a Radio Frequency (RF) signal from a transmit device (not shown). For example, the RF signal is frequency-modulated (FM), but the modulation is not limited to FM. The antenna 10 outputs the received RF signal (hereinafter, also referred to as "received signal") to the BPF 12. The BPF 12 reduces the noise component included in the RF signal. The BPF 12 outputs the RF signal with the noise component reduced (hereinafter, also referred to as "RF signal") to the low-noise amplifier 14. The low-noise amplifier 14 amplifies the RF signal from the BPF 12. The low-noise amplifier 14 outputs the amplified RF signal to the attenuator 16.

The attenuator 16 receives the RF signal from the low-noise amplifier 14. The attenuator 16 is controlled by the controller 46 to attenuate the level of the RF signal accordingly. The attenuator 16 outputs the attenuated RF signal (hereinafter, also referred to as "RF signal") to the distributor 60 of the quadrature detector 18. The distributor 60 splits the RF signal from the attenuator 16 into signals of two systems. The distributor 60 outputs the split RF signals to the first mixer 64 and the second mixer 66. The local oscillator 20 outputs a local oscillation signal to the phase shifter 62 and the first mixer 64. The phase shifter 62 shifts the phase of the local oscillation signal from the local oscillator 20 by 90 degrees. The phase shifter 62 outputs the local oscillation signal with the shifted phase to the second mixer 66.

The first mixer 64 generates the I-phase base band signal (hereinafter, "I signal") by multiplying the RF signal from the distributor 60 by the local oscillation signal from the local oscillator 20. The first mixer 64 outputs the I signal to the first amplifier 22. The second mixer 66 generates the Q-phase base band signal (hereinafter, "Q signal") by multiplying the RF signal from the distributor 60 by the local oscillation signal from the phase shifter 62. The second mixer 66 outputs the Q signal to the second amplifier 24. In this way, the quadrature detector 18 subjects the received signal to quadrature detection and outputs base band signal.

The first amplifier 22 and the second amplifier 24 are variable amplifiers. The gain of the first amplifier 22 and the second amplifier 24 is configured by the configuration circuit 26. The first amplifier 22 amplifiers the I signal from the first mixer 64, and the second amplifier 24 amplifiers the Q signal from the second mixer 66. The I signal output from the first amplifier 22 contains an unnecessary direct current component, and the Q signal output from the second amplifier 24 also contains an unnecessary direct current component. The first amplifier 22 outputs the amplified I signal (hereinafter, also referred to as "I signal") to the first LPF 28. The second amplifier 24 outputs the amplified Q signal (hereinafter, also referred to as "Q signal") to the second LPF 30.

Of the I signals from the first amplifier 22, the first LPF 28 eliminates signals of a frequency equal to or higher than a cut-off frequency, thereby limiting the band. The first LPF 28 outputs the I signal comprised of low-frequency components (hereinafter, also referred to as "I signal") to the first ADC 32. Of the Q signals from the second amplifier 24, the second LPF 30 eliminates signals of a frequency equal to or higher than a cut-off frequency, thereby limiting the band. The second LPF 30 outputs the Q signal comprised of low-frequency components (hereinafter, also referred to as "Q signal") to the second ADC 34.

The first ADC 32 subjects the I signal from the first LPF 28 to analog-to-digital conversion. The first ADC 32 outputs the digitized I signal (hereinafter, also referred to as "I signal") to the first HPF 36, the signal intensity measurement circuit 42, and the direct current component measurement circuit 44. The second ADC 34 subjects the Q signal from the second LPF 30 to analog-to-digital conversion. The second ADC 34 outputs the digitized Q signal (hereinafter, also referred to as "Q signal") to the second HPF 38, the signal intensity measurement circuit 42, and the direct current component measurement circuit 44.

The first HPF 36 reduces the direct current component of the I signal from the first ADC 32 and outputs the I signal with the direct current component reduced (hereinafter, also referred to as "I signal") to the demodulator 40. The second HPF 38 reduces the direct current component of the Q signal from the second ADC 34 and outputs the Q signal with the direct current component reduced (hereinafter, also referred to as "Q signal") to the demodulator 40. The first HPF 36 and the second HPF 38 can be said to be DC correctors that control the constellation in which the I, Q signals are assigned to the orthogonal plane such that the origin on the orthogonal plane is at the center.

The demodulator 40 demodulates the I signal from the first HPF 36 and the Q signal from the second HPF 38. The demodulator 40 outputs a demodulated signal resulting from the demodulation. For example, the demodulated result from the demodulator 40 represents an audio signal or data. For demodulation, a publicly known technology may be used, and a description thereof is omitted.

The signal intensity measurement circuit 42 receives the I signal from the first ADC 32 and receives the Q signal from the second ADC 34. This is equivalent to receiving the base band signal from the quadrature detector 18. The signal intensity measurement circuit 42 measures the signal intensity of the base band signal by, for example, calculating a sum of the square of the I signal and the square of the Q signal. Measuring the signal intensity of the base band signal is equivalent to measuring the level of the desired wave. The signal intensity measurement circuit 42 outputs the value of the measured signal intensity to the configuration circuit 26.

The configuration circuit 26 receives the value of the signal intensity from the signal intensity measurement circuit 42. The configuration circuit 26 configures the gain of the first amplifier 22 and the second amplifier 24 based on the value of the signal intensity. For example, the configuration circuit 26 maintains a target value in advance, and the configuration circuit 26 decreases the gain when the value of the signal intensity is larger than the target value and increases the gain when the value of the signal intensity is smaller than the target value. Such gain control represents Automatic Gain Control, and a publicly known technology may be used for AGC.

The direct current component measurement circuit 44 calculates a moving average of the I signal from the first ADC 32 and calculates a moving average of the Q signal from the second ADC 34. The direct current component measurement circuit 44 measures the magnitude of the direct current component included in the base band signal by calculating a sum of the square of the moving average for the I signal and the square of the moving average for the Q signal. The magnitude of the direct current component represents the DC level mentioned above. Measuring the magnitude of the direct current component is equivalent to measuring the level of the interference wave. The direct current component measurement circuit 44 outputs the magnitude of the direct current component to the controller 46.

The controller 46 switches between attenuation control and absence thereof based on the magnitude of the direct current component measured by the direct current component measurement circuit 44 and the signal intensity measured by the signal intensity measurement circuit 42, attenuation control being performed to exercise control to attenuate the level of the RF signal input to the quadrature detector 18. Absence of attenuation control will be referred to as "normal control". FIGS. 2A-2B show a data structure of the table maintained in the controller 46. FIG. 2A shows a condition observed while normal control is in effect, and FIG. 2B shows a condition observed while attenuation control is in effect. As shown in FIG. 2A, when the magnitude of the direct current component is equal to larger than the first threshold value and the signal intensity is equal to larger than the second threshold value while normal control is in effect, the controller 46 switches to attenuation control. In attenuation control, the attenuation in the attenuator 16 is configured to be larger than that of normal control, or the gain in the low-noise amplifier 14 is configured to be smaller than that of normal control. When the aforementioned condition is not met, on the other hand, the controller 46 maintains normal control.

As shown in FIG. 2B, when the magnitude of the direct current component is smaller than the third threshold value and the signal intensity is smaller than the fourth threshold value while attenuation control is in effect, the controller 46 switches to normal control. This makes the attenuation in the attenuator 16 smaller than that of attenuation control or makes the gain in the low-noise amplifier 14 larger than that of attenuation control. By configuring the threshold values such that the first threshold value>the third threshold value, and the second threshold value>the fourth threshold value, hysteresis is provided. The values may be defined such that the second threshold value=the fourth threshold value. When the aforementioned condition is not met, on the other hand, the controller 46 maintains attenuation control.

It should be noted that the controller 46 may switch between attenuation control and absence thereof by using only the magnitude of the direct current component measured by the direct current component measurement circuit 44 and without using the signal intensity measured by the signal intensity measurement circuit 42. In this process, when the magnitude of the direct current component is equal to or larger than the first threshold value while normal control is in effect, the controller 46 switches to attenuation control. When the aforementioned condition is not met, on the other hand, the controller 46 maintains normal control. Further, when the magnitude of the direct current component is smaller than the third threshold value while attenuation control is in effect, the controller 46 switches to normal control. When the aforementioned condition is not met, on the other hand, the controller 46 maintains attenuation control.

The controller 46 is described as exercising control based on the magnitude of the moving average of the direct current component measured by the direct current component measurement circuit 44. Alternatively, control may be based on the amount of variation per a unit time instead of the absolute magnitude of the direct current component. Generally, when the interference wave occurs, a direct current component is produced abruptly. Therefore, attenuation control may be initiated on the condition that the amount of variation in the direct current component per a unit time exceeds a predetermined threshold value.

The features are implemented in hardware such as a CPU, a memory, or other LSI's, of any computer and in software such as a program loaded into a memory and a program recorded in a non-transitory, computer-readable recording medium. The figure depicts functional blocks implemented by the cooperation of these elements. Therefore, it will be understood by those skilled in the art that the functional blocks may be implemented in a variety of manners by hardware only, software only, or by a combination of hardware and software.

Figure 3:
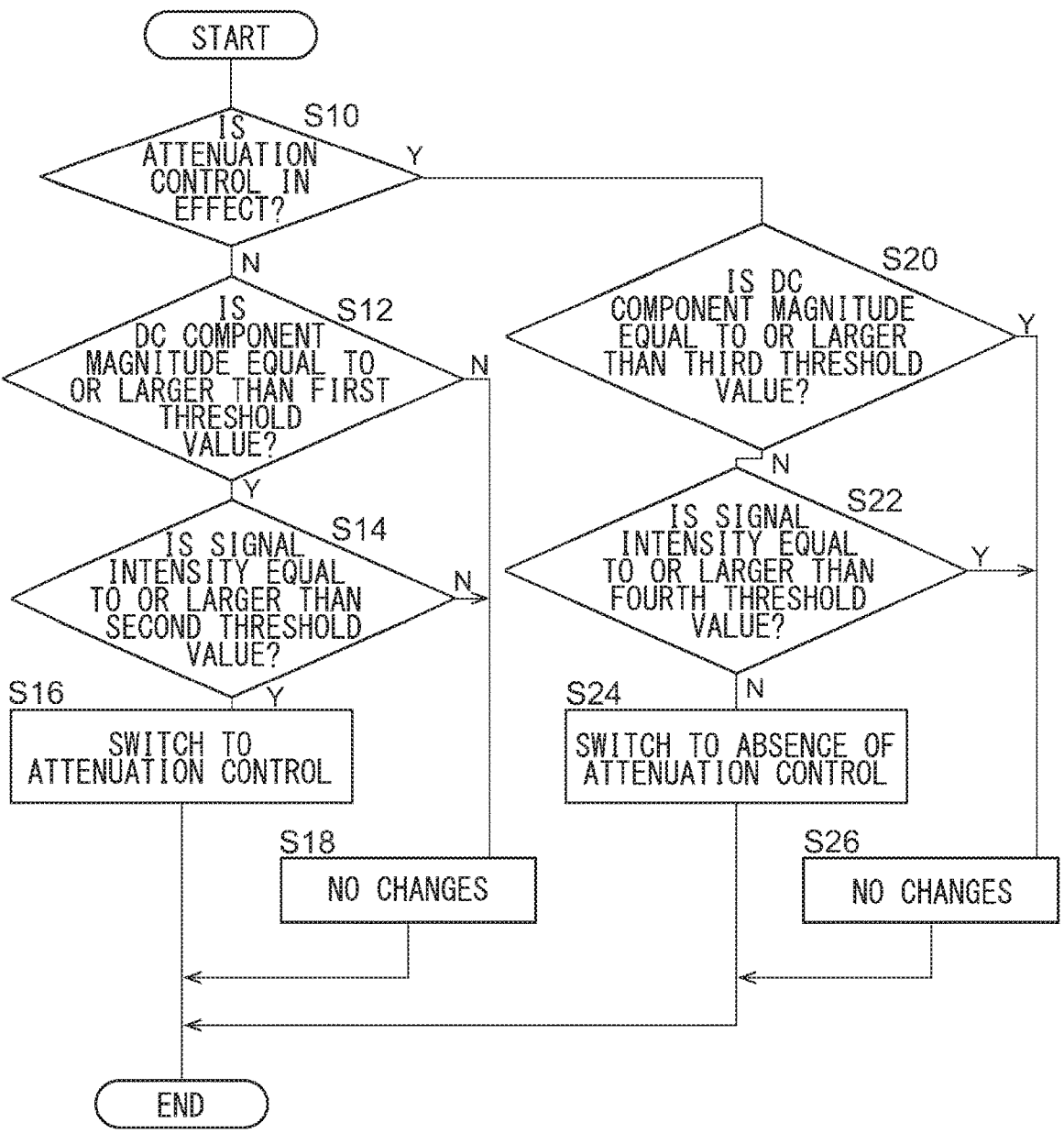
FIG. 3 is a flowchart showing the steps of control by the receive device of FIG. 1.

A description will be given of the operation of the receive device 100 having the above configuration. FIG. 3 is a flowchart showing the steps of control by the receive device 100. In the case attenuation control is not being in effect (N in S10), the controller 46 switches to attenuation control (S16) provided that the magnitude of the direct current component is equal to or larger than the first threshold value (Y in S12) and the signal intensity is equal to or larger than the second threshold value (Y in S14). When the magnitude of the direct current component is not equal to or larger than the first threshold value (N in S12) or when the signal intensity is not equal to or larger than the second threshold value (N in S14), the controller 46 makes no changes regarding attenuation control (S18). In the case attenuation control is being in effect (Y in S10), the controller 46 switches to absence of attenuation control (S24) provided that the magnitude of the direct current component is not equal to or larger than the third threshold value (N in S20) and the signal intensity is not equal to or larger than the fourth threshold value (N in S22). When the magnitude of the direct current component is equal to or larger than the third threshold value (Y in S20) or when the signal intensity is equal to or larger than the fourth threshold value (Y in S22), the controller 46 makes no changes regarding attenuation control (S26).

Figure 4:
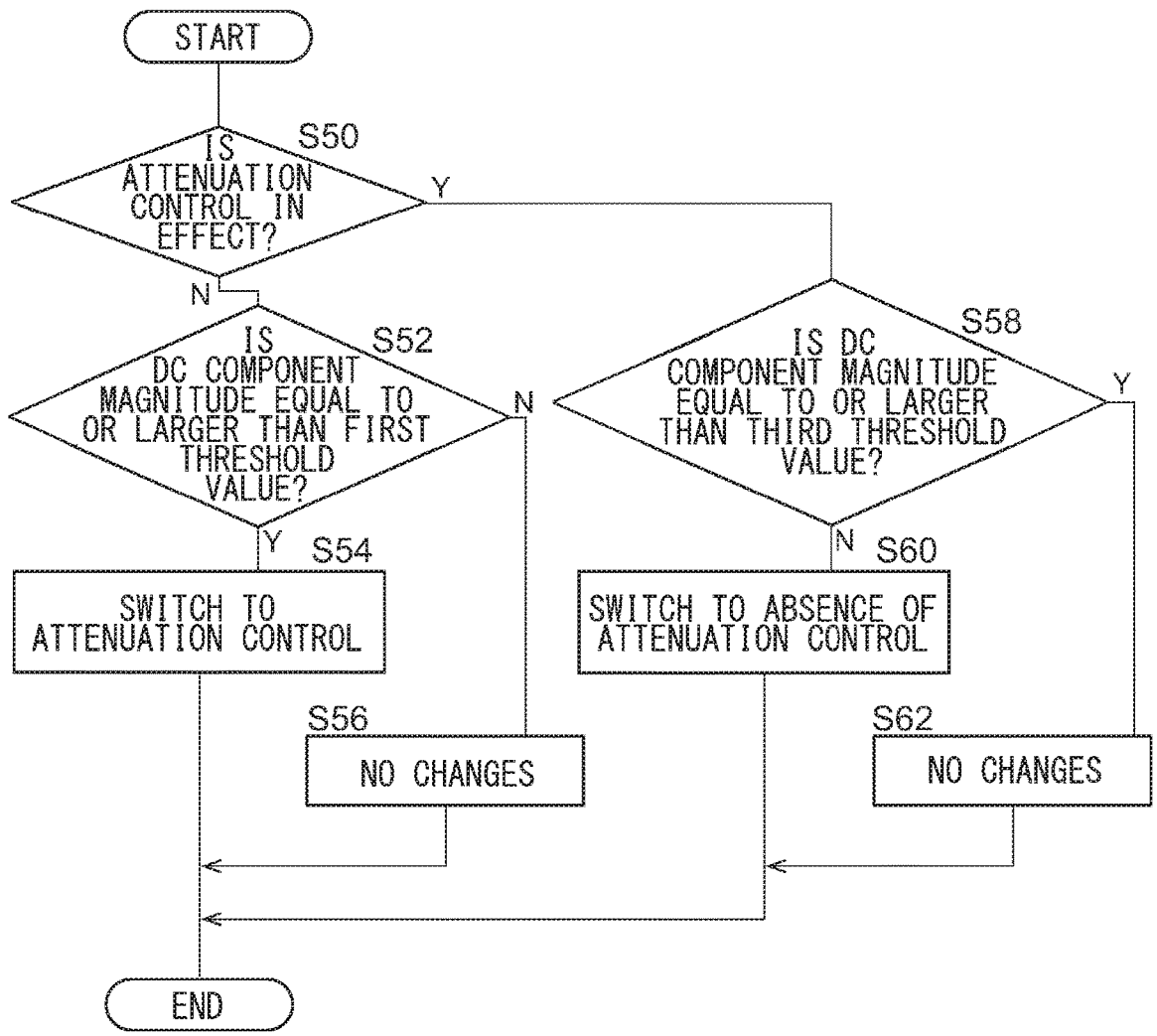
FIG. 4 is a flowchart showing the alternative steps of control by the receive device of FIG. 1.

FIG. 4 is a flowchart showing the alternative steps of control by the receive device 100. In the case attenuation control is not being in effect (N in S50), the controller 46 switches to attenuation control (S54) provided that the magnitude of the direct current component is equal to or larger than the first threshold value (Y in S52). When the magnitude of the direct current component is not equal to or larger than the first threshold value (N in S52), the controller 46 makes no changes regarding attenuation control (S56). In the case attenuation control is being in effect (Y in S50), the controller 46 switches to absence of attenuation control (S60) provided that the magnitude of the direct current component is not equal to or larger than the third threshold value (N in S58). When the magnitude of the direct current component is equal to or larger than the third threshold value (Y in S58), the controller 46 makes no changes regarding attenuation control (S62).

According to the embodiment, the level of the RF signal input to the quadrature detector is controlled to be attenuated when the magnitude of the direct current component is equal to or larger than the threshold value. Accordingly, the impact of an interference wave is reduced. Further, since the impact of an interference wave is reduced, degradation in the demodulated signal due to the interference wave is inhibited. Further, since the attenuator is controlled by the controller to attenuate the level of the RF signal, the impact of an interference wave is reduced. Further, the level of the RF signal is controlled to be attenuated when the magnitude of the direct current component is equal to or larger than the first threshold value and when the signal intensity is equal to larger than the second threshold value so that degradation in the sensitivity is inhibited from occurring when only the desired wave is received. Further, since the gain of the first amplifier and the second amplifier is configured based on the signal intensity, amplification adapted to the signal intensity of the desired wave can be performed. Further, since the magnitude of the direct current component is measured, the relative level of the interference wave outside the ADC band can be acquired without adding a circuit in the receive device of direct conversion type.

Described above is an explanation based on an exemplary embodiment. The embodiment is intended to be illustrative only and it will be understood by those skilled in the art that various modifications to constituting elements and processes could be developed and that such modifications are also within the scope of the present invention.

In the embodiment, the controller 46 in an attenuation control mode configures the attenuation in the attenuator 16 to be larger than that of normal control or configures the gain in the low-noise amplifier 14 to be smaller than that of normal control. Alternatively, however, the BPF 12 may be provided with a plurality of types of filters, and the controller 46 may switch between the plurality of types of filters when performing attenuation control. In this case, the controller 46 selects a filter that minimizes the magnitude of the direct current component measured by the direct current component measurement circuit 44. According to this variation, the flexibility in the configuration is improved.

What is claimed is:

1. A receive device comprising:
    a quadrature detector that subjects a received signal to quadrature detection and outputs a base band signal;
    a direct current component measurement circuit that measures a magnitude of a direct current component included in the base band signal from the quadrature detector;
    a high-pass filter that reduces the direct current component included in the base band signal from the quadrature detector;
    a demodulator that demodulates the base band signal output from the high-pass filter;
    an attenuator that outputs the received signal to the quadrature detector; and
    a controller that exercises control to attenuate a level of the received signal input to the quadrature detector by controlling the attenuation of the attenuator when the magnitude of the direct current component measured by the direct current component measurement circuit is equal to or larger than a threshold value.

2. The receive device according to claim 1, further comprising:
    a low pass filter that eliminates signals of a frequency equal to or higher than a cut-off frequency,
    a signal intensity measurement circuit that measures a signal intensity of the base band signal from the low pass filter, wherein
    the controller exercises control to attenuate a level of the received signal input to the quadrature detector when the magnitude of the direct current component measured by the direct current component measurement circuit is equal to or larger than the threshold value and when the signal intensity measured by the signal intensity measurement circuit is equal to larger than another threshold value.

3. A non-transitory computer readable recording medium encoded with a computer program, the program comprising computer-implemented modules including:
    measuring a magnitude of a direct current component included in a base band signal from a quadrature detector that subjects a received signal to quadrature detection;
    reducing the direct current component included in the base band signal from the quadrature detector;
    demodulating the base band signal with the direct current component reduced;
    outputting the received signal to the quadrature detector; and
    exercising control to attenuate a level of the received signal input to the quadrature detector by controlling the attenuation of an attenuator when the magnitude of the direct current component measured is equal to or larger than a threshold value.

* * * * *